United States Patent [19]

Moore et al.

[11] Patent Number: 5,459,873
[45] Date of Patent: Oct. 17, 1995

[54] METHOD AND COMMUNICATION SYSTEM FOR IMPROVED CHANNEL SCANNING AND LINK ESTABLISHMENT DETERMINATIONS

[75] Inventors: Morris Moore, Wellington; Clinton C. Powell, II, Lake Worth, both of Fla.

[73] Assignee: Motorola, Inc., Schaumburg, Ill.

[21] Appl. No.: 100,784

[22] Filed: Aug. 21, 1993

[51] Int. Cl.⁶ .................................................. H04B 7/02
[52] U.S. Cl. .................... 455/277.1; 455/33.3; 455/53.1; 370/29
[58] Field of Search ........................... 455/33.2, 33.3, 455/34.1, 34.2, 52.1, 52.3, 53.1, 56.1, 59, 60, 63, 64, 65, 101, 277.1, 161.1, 161.3, 67.1; 370/29, 85.7, 95.1, 95.3

[56] References Cited

U.S. PATENT DOCUMENTS 4,742,568  5/1988  Furuya .
4,797,947  1/1989  Labedz .................................. 455/33.3
4,853,972  8/1989  Ueda et al. .
4,914,714  4/1990  Tamura .
5,097,484  3/1992  Akaiwa ............................. 455/101 X Primary Examiner—Reinhard J. Eisenzopf
Assistant Examiner—Chi H. Pham
Attorney, Agent, or Firm—Pablo Meles; John H. Moore

[57] ABSTRACT

A method for improved channel scanning and link establishment determinations in a communication system (30) having at least one base station (36) with at least two antennas (32 and 34) and at least one portable unit (38 or 40) capable of linking with the base station, comprises the steps at the base station of determining (104) whether a communication resource on the base station is operating as a control channel and switching or alternating (106) antennas periodically if the communication resource operates as a control channel. Otherwise, the antennas are switched in accordance with a diversity algorithm (54) if the communication resource operates as a traffic bearing channel.

17 Claims, 3 Drawing Sheets

5,459,873

METHOD AND COMMUNICATION SYSTEM FOR IMPROVED CHANNEL SCANNING AND LINK ESTABLISHMENT DETERMINATIONS

TECHNICAL FIELD

This invention relates generally to wireless data systems and communication systems and in particular, to a method for improved reliable link establishment determinations to such systems.

BACKGROUND

In wireless communication systems and particularly in Personal Communications Services/Networks (PCS/PCN) systems, portable and mobile units often poll or scan other base stations in the event of a handover. A confident estimate using signal strength measurements (e.g., via Received Signal Strength Indicators (RSSI)) is essential for a successful handover to occur. A certain amount of error is inherent in depending on these signal strength measurements to assure a reliable connection, therefore a number of samples are used to increase the reliability of the determination. The reliability of the connections are impaired for a wide variety of reasons including fading, multipath signals and variations in time, space and frequency. A standard deviation of the error provides an indication of the reliability of the communication link. Unfortunately, many samples are required to reduce the standard deviation to a level where a confident decision can be made whether a portable or mobile unit would provide a reliable link with a particular base station, which in turn would make the process of establishing a link with a base station longer. Thus, a need exists for a method for reducing the number of samples required to obtain an accurate and reliable determination and increase the efficiency in link establishment to a base station.

SUMMARY OF THE INVENTION

A method for improved channel scanning and link establishment determinations in a communication system having at least one base station with at least two antennas and at least one portable unit capable of linking with the base station, comprises the steps at the base station of determining whether a communication resource on the base station is operating as a control channel and switching antennas periodically if the communication resource operates as a control channel.

In another aspect of the present invention, a base station in a communication system providing for improved channel scanning and link establishment determinations having at least two antennas at the base station and at least one portable unit capable of linking with the base station, comprises a device for determining whether a communication resource on the base station is operating as a control channel and a device for switching antennas periodically if the communication resource operates as a control channel.

DETAILED DESCRIPTION OF THE PREFERRED EMBODIMENT

Figure 1:
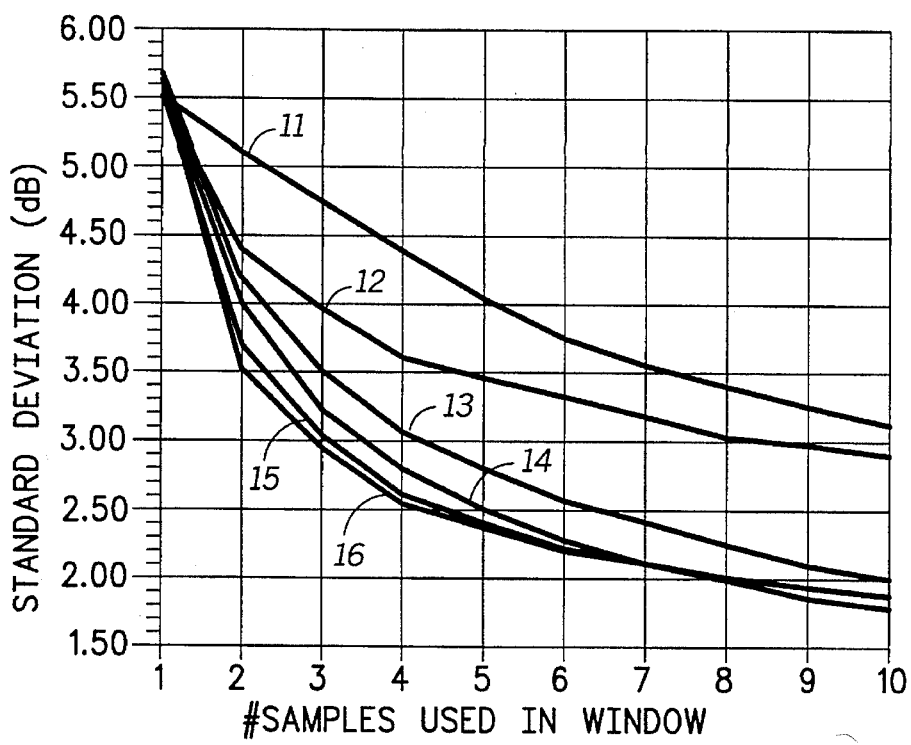
FIG. 1 is graph illustrating the standard deviation versus the number of samples used for portables at various speeds in accordance with prior single antenna systems.
Figure 2:
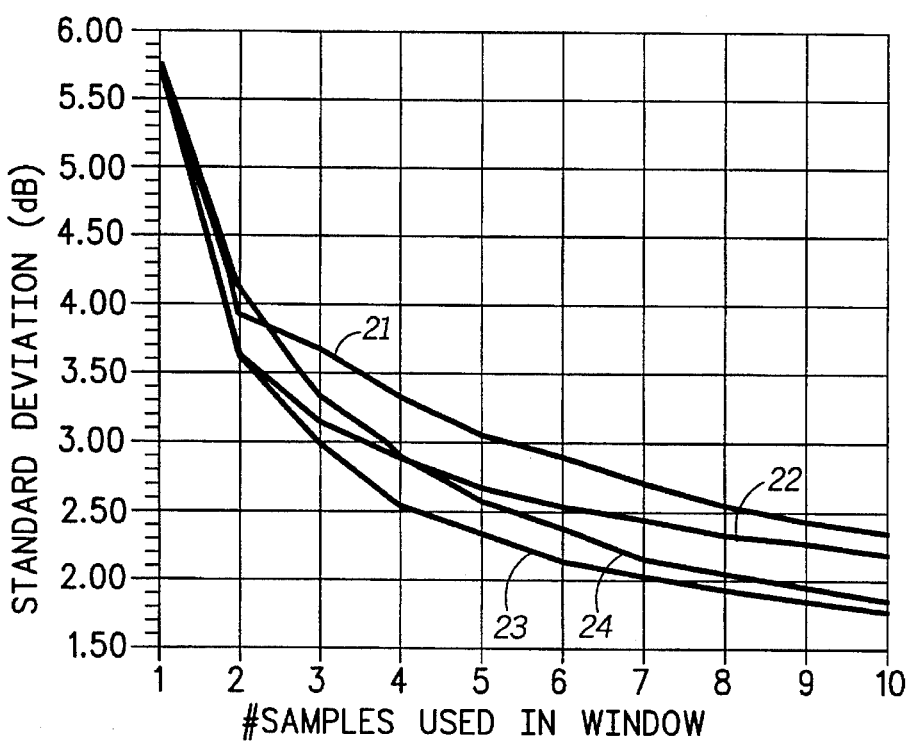
FIG. 2 is graph illustrating the standard deviation versus the number of samples used for portables at various speeds in accordance with the present invention.

Referring to FIGS. 1 & 2, there is shown graphs 10 and 20 illustrating the standard deviation versus the number of samples used for a portable at various speeds in accordance with the prior systems and in accordance present invention respectively. Referring to FIG. 1, line 11 shows samples taken at an average of 3 mph.; line 12 at a maximum of 3 mph.; line 13 at an average of 20 mph; line 14 at an average of 40 mph; line 15 at a maximum of 20 mph; and line 16 at a maximum of 40 mph. Referring to FIG. 2, line 21 shows samples at an average of 3 mph; line 22 at an average of 20 mph; line 23 at a maximum of 3 mph; and line 24 at a maximum of 20 mph. A confident estimate using signal strength measurements is critical for successful handovers between base stations. As previously stated, a certain amount of error is inherent in depending on signal strength measurements and such errors can be reduced by taking a larger amount of samples. A large amount of overhead and inefficiency is associated with taking so many samples in order to reach a tolerable confidence level. Fortunately, the standard deviation of this error indicates the accuracy of the estimates. The present invention provides for a method which reduces the standard deviation of the error resulting in a more confident estimate within a fewer number of samples.

In DECT as in other systems, diversity (multiple antennas having either different location and/or direction) will be employed at base sites through the use of two or more antennas. The cost associated with the increased complexity, although high, can be distributed among the many users of the system. In such systems, diversity is not employed for the control channel or beacon channel but only for the traffic bearing channels. Diversity at the portable is also desirable, but the cost associated with such a portable is prohibitive in consumer markets. Thus, present systems, either having no diversity at the portable or diversity antennas at the base which are only used for the traffic bearing channels, thereby have no diversity gain when the portable is scanning for strong base stations to use in the event of a desired handover. This is due in part to the fact that the portable is not in direct communication with the base stations it is scanning. In these systems, a control channel, dummy bearer channels, or beacons are typically provided. On these channels, the base stations are transmitting, but the portables are not. By alternating or circulating among the antennas available at the base station while the base station is serving as the control channel (dummy bearer channel or beacon), an improved estimate may be made by the portable scanning them in a fewer number of samples.

FIG. 1 shows the standard deviation of the error for two estimation techniques when no antenna switching is employed during a control channel transmission. FIG. 2 shows a reduced standard deviation when alternating between two antennas at the base during the control channel transmission. If the target standard deviation (upon which to make a decision to establish a link) was 3 dB and the portable user's velocity was 3 mph, then the prior single antenna systems would require approximately 10 samples to achieve such an estimate. On the other hand, referring to FIG. 2, only 4 samples are required to achieve a 3 dB standard deviation using alternating antennas which would reduce the amount of time required to form the estimate by over 50%.

Figure 3:
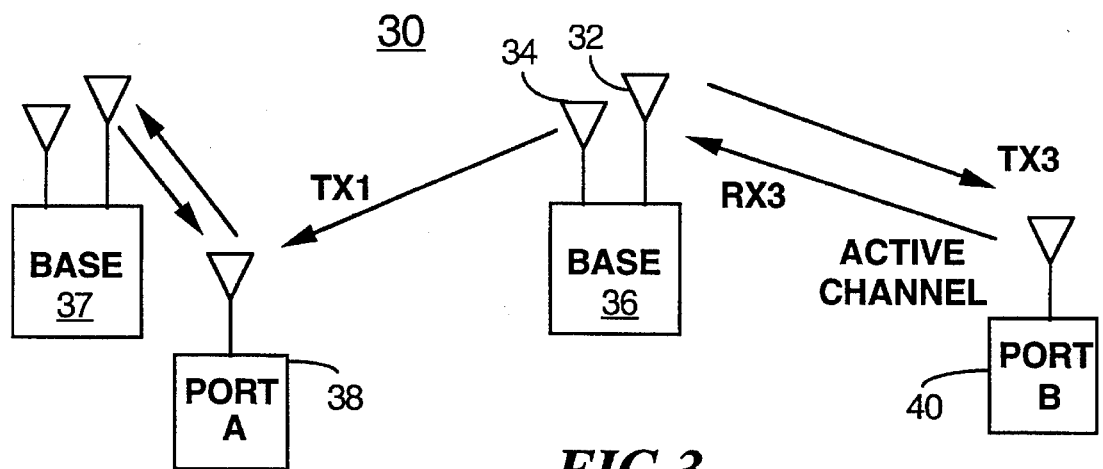
FIG. 3 is a block diagram of a communication system in accordance with the present invention.

Referring to FIG. 3, there is shown a communication system 30 in accordance with the present invention. As shown, the system 30 has at least one base station 36 having at least two antennas 32 and 34 and at least one portable unit capable of linking with the base station 36. In this case, a portable unit 40 shows an active link between the portable unit 40 and the base station 36. Additionally, another portable 38 scans the base station 36 for a control channel (or dummy bearer channel or beacon). The portable unit 38 scans base station 36 and others within range (not shown) to determine if a hand-off from its present communication channel with an existing base 37 to the base station 36 will be reliable. The portable unit 38 could also scan base station 36 and others in an initial link establishment or re-establishment scenario. The base station provides at least one communications resource to provide the control channel transmissions. The communications resource can be a given time slot within a frame (see FIG. 6) in a time division multiple access (TDMA) system or a given time slot in a time division duplex (TDD) system, a given frequency, or a given frequency within a particular time slot in a frequency division multiple access (FDMA) system, or a given time slot in a code division multiple access (CDMA) system. Operationally, the communication system 30 determines whether a communication resource on the base station is operating as a control channel (or dummy bearer channel or beacon channel) and then alternately switches antennas (from antenna 32 to antenna 34 or vice versa) periodically if the communication is operating as a control channel. If the system has more than 2 antennas, then the antennas can be switched among each other preferably in a circular fashion. If the communication resource is not operating as a control channel, then the antennas would not alternately switch periodically, but would switch in accordance with a diversity algorithm as is known in the art for traffic bearing channels or operate as a conventional system if desired.

Figure 4:
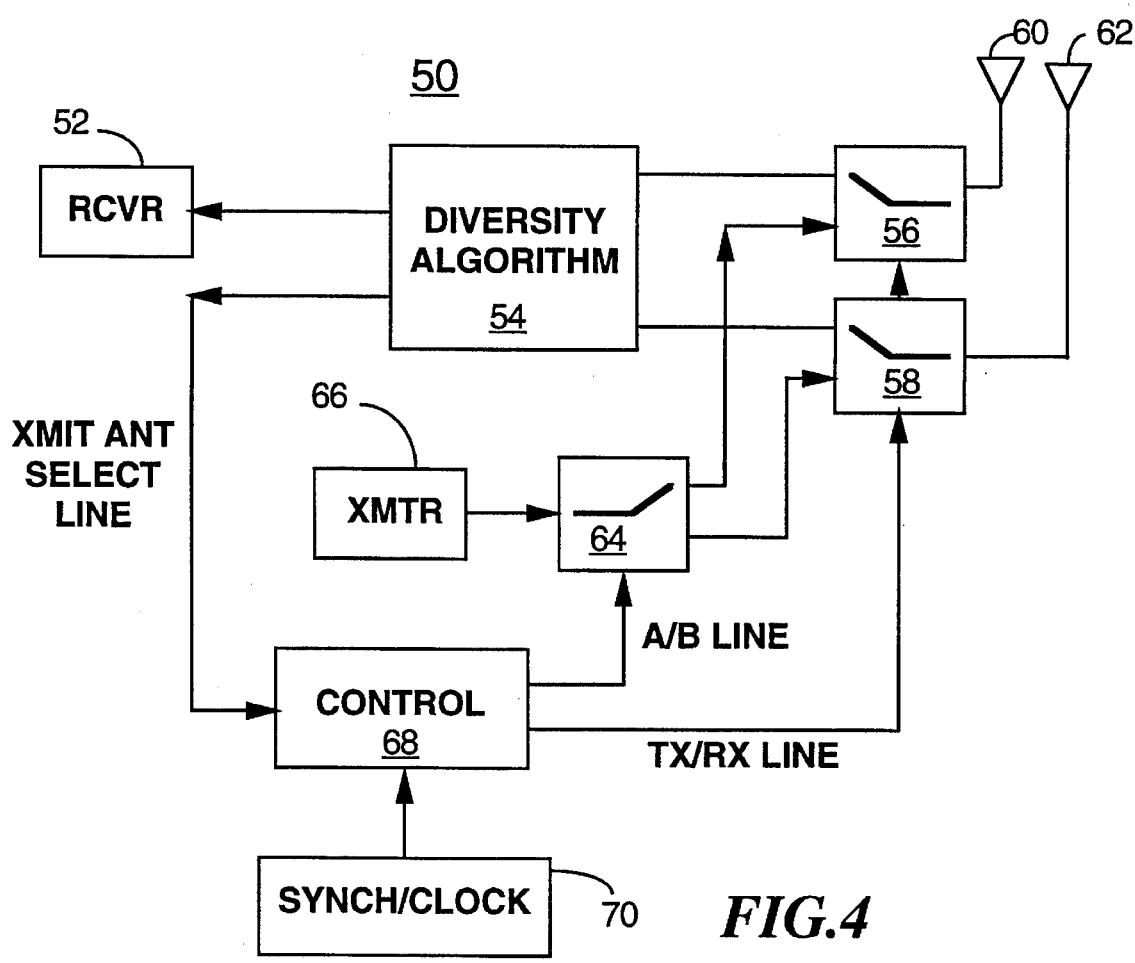
FIG. 4 is a block diagram of base station transceiver in accordance with the present invention.

Referring to FIG. 4, there is shown a block diagram of an base station transceiver 50 in accordance with the present invention. The base station transceiver 50 generally comprises antennas 60 and 62 coupled via switches 56 and 58 to a processor having memory (not shown) having a diversity algorithm 54 which couples to a receiver 52. Additionally, the switches 56 and 58 are coupled to a transmitter 66 via a switch 64. Switch 64 is operated in accordance with a control unit 68 which is coupled to a synchronized clock 70. Further, the control unit 68 receives inputs from the diversity algorithm (54) processor which aides in determining whether the transmitter switch 64 should be coupled to antenna 60 or antenna 62.

Figure 5:
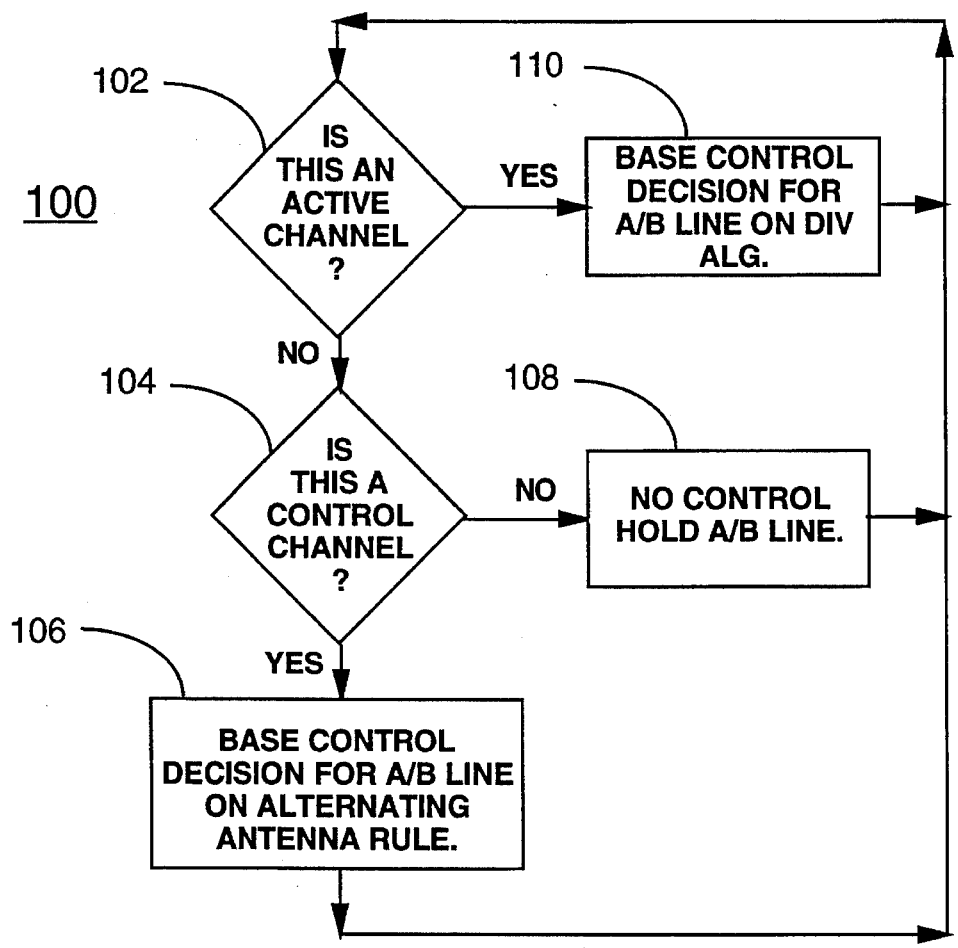
FIG. 5 is a flow chart for operating diversity antennas at a base station in accordance with the present invention.

Operationally, referring to FIGS. 4 and 5, the base station in an algorithm 100 initially determines if the communication resource is an active channel at step 102. If the communication resource being interrogated is an active channel, then the control for antenna switch 64 at step 110 is based on the diversity algorithm (54) provided by the particular system. If the communication resource is not an active channel, then the base station at step 104 determines whether the communication resource is a control channel (or dummy bearer channel or beacon channel). If the communication resource at the base station is not a control channel, then the switch 64 is held in position at step 108. If the base station determines at step 106 that the communication resource at the base station is a control channel (or dummy bearer channel or beacon channel), then the decision for switching the antenna switch 64 is based on an alternating antenna rule or optionally in the case of more than two antennas, a circulating switching scheme would switch among the available antennas as appropriate. Finally, the base station interrogates the next communication resource to determine if the channel is either active, idle, or a control channel.

The present invention is equally applicable to several communication systems such as the Digital European Cordless Phone (DECT) system, CT-2 systems, or other Personal Communication Systems/Networks. The present invention is particularly advantageous where a control channel or beacon is dedicated to a particular communication resource, such as a particular frequency or a particular time slot or a particular frequency and time slot (in a FDMA system). The system of the present invention is ideally suited for a time division duplex system where the antenna switches alternatively at every frame.

Figure 6:
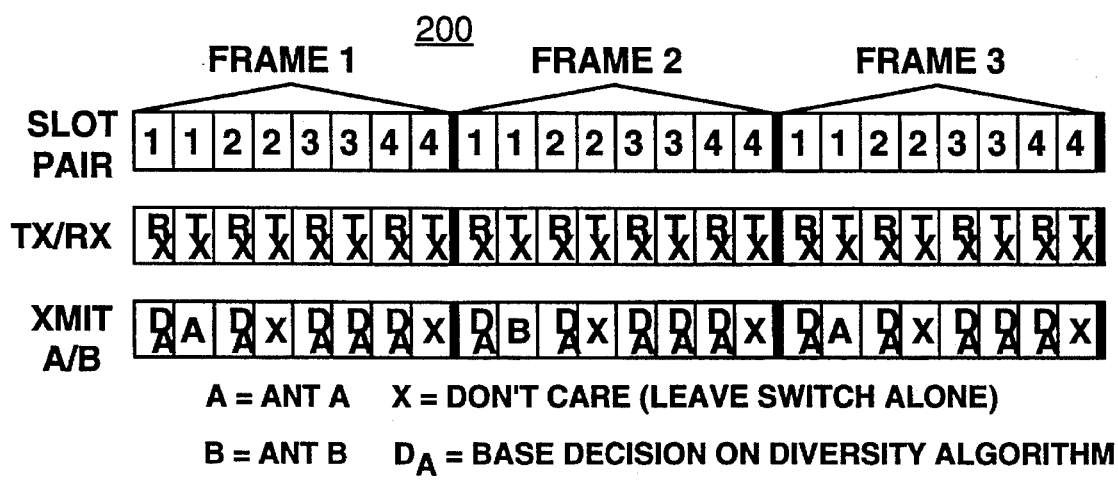
FIG. 6 is a block diagram of frames and slots in accordance with the operation of the present invention.

Referring to FIG. 6, there is shown a frame by frame and slot by slot scenario of the alternating antenna scheme when the communication resource is a control channel at the base. In this instance, the second slot of the 1st pair of slots is operating as a control channel. Thus, the antenna is being switched alternatively from frame to frame at the same time slot. Here, the time slot is the communication resource in this time division duplex system. Of course, other communication resources can be used within contemplation of the present invention such as other time slots within the same frame or other time slots in other frequencies in a FDMA system.

The other time slots or other communication resources within Frames 1, 2 or 3, will either operate as an active channel where the diversity algorithm is in effect or as an idle channel where the system does not care which antenna is connected.

What is claimed is:

1. A method for improved channel scanning and link establishment reliability determinations in a communication system having at least one base station having at least two antennas and at least one portable unit capable of linking with the base station, comprising the steps of:
   at the base station:
      determining whether a communication resource on the base station is operating as a control channel; and
      switching between the at least two antennas periodically if the communication resource operates as a control channel to obtain the link establishment reliability determination for handoff, or for link establishment or for link re-establishment.

2. The method of improved channel scanning and link establishment determination in accordance with claim 1, further comprising the step of switching between the at least two antennas in accordance with a diversity algorithm if the communication resource operates as a traffic bearing channel.

3. The method of claim 1, wherein the communication system comprises a Digital European Cordless Telephone (DECT) system.

4. The method of claim 1, wherein the communication system comprises a second generation cordless phone (CT-2) system.

5. The method of claim 1, wherein the communication system comprises a Personal Communication System (PCS).

6. The method of claim 1, wherein the step of switching between the at least two antennas periodically occurs at every frame in a time division duplex system when the communication resource operates as a control channel and wherein the base station switches between the at least two antennas in accordance with a diversity algorithm if the communication resource operates as a traffic bearing channel.

7. A method for improved channel scanning and link establishment reliability determinations in a communication system having at least one base station having at least two antennas and at least one portable unit capable of linking with the base station, comprising the steps of:

at the base station:
- determining whether a communication resource on the base station is operating as a control channel;
- switching between the at least two antennas periodically if the communication resource operates as a control channel to obtain the link establishment reliability determination for handoff, or for link establishment or for link re-establishment; and
- switching the antennas in accordance with a diversity algorithm if the communication resource operates as a traffic bearing channel.

8. The method of claim 7, wherein the communication system comprises a Digital European Cordless Telephone (DECT) system.

9. The method of claim 7, wherein the communication system comprises a second generation cordless phone (CT-2) system.

10. The method of claim 7, wherein the communication system comprises a Personal Communication System (PCS).

11. The method of claim 7, wherein the step of switching the antenna periodically occurs at every frame in a time division duplex system.

12. The method of claim 7, wherein the step of switching between the at least two antennas periodically only occurs when the base station is not receiving other information.

13. A communication system providing for improved channel scanning and link establishment reliability determinations having at least one base station having at least two antennas and at least one portable unit capable of linking with the base station, the at least one base station, comprising:

- means for determining whether a communication resource on the base station is operating as a control channel;
- means for switching antennas periodically if the communication resource operates as a control channel to obtain the link establishment reliability determination for handoff, or for link establishment or for link re-establishment; and
- means for switching the antennas in accordance with a diversity algorithm if the communication resource operates as a traffic bearing channel.

14. The communication system of claim 13, wherein the communication system comprises a Digital European Cordless Telephone (DECT) system.

15. The communication system of claim 13, wherein the communication system comprises a second generation cordless phone (CT-2) system.

16. The communication system of claim 13, wherein the communication system comprises a Personal Communication System (PCS).

17. The communication system of claim 13, wherein the means for switching the antenna periodically switches among the at least two antennas at every frame in a time division duplex system.

* * * * *